(12) United States Patent
Gratton (10) Patent No.: US 9,367,669 B2
(45) Date of Patent: Jun. 14, 2016

(54) CONTENT SOURCE IDENTIFICATION USING MATRIX BARCODE

(75) Inventor: Max S. Gratton, Lakewood, CO (US)

(73) Assignee: ECHOSTAR TECHNOLOGIES L.L.C., Englewood, CO (US)

(*) Notice: Subject to any disclaimer, the term of this patent is extended or adjusted under 35 U.S.C. 154(b) by 0 days.

(21) Appl. No.: 13/035,474

(22) Filed: Feb. 25, 2011

(65) Prior Publication Data

US 2012/0218471 A1    Aug. 30, 2012

(51) Int. Cl.

| G06F 21/10 | (2013.01) |
|---|---|
| G06F 21/62 | (2013.01) |
| H04L 9/32 | (2006.01) |
| H04N 5/931 | (2006.01) |
| H04N 21/4627 | (2011.01) |

(Continued)

(52) U.S. Cl.
CPC .............. *G06F 21/10* (2013.01); *G06F 21/6227* (2013.01); *H04L 9/32* (2013.01); *H04L 9/321* (2013.01); *H04N 5/931* (2013.01); *H04N 21/2541* (2013.01); *H04N 21/4334* (2013.01); *H04N 21/4627* (2013.01); *H04N 21/8352* (2013.01); *H04N 21/8358* (2013.01); *H04L 2209/80* (2013.01)

(58) Field of Classification Search
CPC ... G06F 17/30879; G06F 17/00; G06F 21/10; G06F 21/6227; H04L 2209/80; H04L 9/32; H04L 9/3231; H04N 13/0239
USPC ........ 726/4, 9, 27, 28, 32, 34, 35, 3; 348/441, 348/564; 713/170, 185; 380/277
See application file for complete search history.

(56) References Cited

U.S. PATENT DOCUMENTS

| 4,809,325 A | 2/1989 | Hayashi et al. |
|---|---|---|
| 4,837,414 A | 6/1989 | Edamula |

(Continued)

FOREIGN PATENT DOCUMENTS

| CA | 2 634 951 A1 | 1/2010 |
|---|---|---|
| CN | 1352765 A | 6/2002 |

(Continued)

OTHER PUBLICATIONS

Eui-Hyun Jung et al., "A Robust Digital Watermarking System Adopting 2D Barcode against Digital Piracy on P2P Network", IJCSNS International Journal of Computer Science and Network Security, vol. 6 No. 10, Oct. 2006.*

(Continued)

*Primary Examiner* — Kari Schmidt
(74) *Attorney, Agent, or Firm* — Kilpatrick Townsend & Stockton LLP (57) ABSTRACT

A system for fingerprinting audiovisual content. The system includes a content receiver and a display device in communication with the content receiver. The content receiver is configured to receive a video signal, where the video signal includes audiovisual content. The content receiver may then be configured to generate a matrix barcode that includes identification data. The content receiver is also configured to create a fingerprinted content that includes the audiovisual content from the video signal and the matrix barcode. The content receiver may then be configured to output the fingerprinted content. The display device is configured receive the fingerprinted content form the content receiver. Also, the display device is configured to display the fingerprinted content.

19 Claims, 4 Drawing Sheets

(51) Int. Cl.
*H04N 21/8352* (2011.01)
*H04N 21/254* (2011.01)
*H04N 21/433* (2011.01)
*H04N 21/8358* (2011.01)

(56) References Cited

U.S. PATENT DOCUMENTS

| | | | |
|---|---|---|---|
| 5,500,681 A | 3/1996 | Jones | |
| 5,510,603 A | 4/1996 | Hess et al. | |
| 5,581,636 A | 12/1996 | Skinger | |
| 5,602,377 A | 2/1997 | Beller et al. | |
| 5,703,349 A | 12/1997 | Meyerson et al. | |
| 5,959,285 A | 9/1999 | Schuessler | |
| 5,963,265 A | 10/1999 | Bae et al. | |
| 5,978,855 A | 11/1999 | Metz et al. | |
| 6,006,990 A | 12/1999 | Ye et al. | |
| 6,058,238 A | 5/2000 | Ng | |
| 6,263,502 B1 | 7/2001 | Morrison et al. | |
| 6,438,751 B1 | 8/2002 | Voyticky et al. | |
| 6,512,919 B2 | 1/2003 | Ogasawara | |
| 6,556,273 B1 | 4/2003 | Wheeler et al. | |
| 6,704,929 B1 | 3/2004 | Ozer et al. | |
| 6,766,956 B1 | 7/2004 | Boylan et al. | |
| 6,983,304 B2 | 1/2006 | Sato | |
| 7,046,161 B2 | 5/2006 | Hayes | |
| 7,206,029 B2 | 4/2007 | Cohen-Solal | |
| 7,206,409 B2 | 4/2007 | Antonellis et al. | |
| 7,221,405 B2 | 5/2007 | Basson et al. | |
| 7,244,404 B2 | 7/2007 | Rosenberg et al. | |
| 7,328,848 B2 | 2/2008 | Xia et al. | |
| 7,349,668 B2 | 3/2008 | Ilan et al. | |
| 7,369,180 B2 | 5/2008 | Xing | |
| 7,373,652 B1 | 5/2008 | Bayrakeri et al. | |
| 7,387,250 B2 | 6/2008 | Muni | |
| 7,394,519 B1 | 7/2008 | Mossman et al. | |
| 7,424,976 B2 | 9/2008 | Muramatsu | |
| 7,443,449 B2 | 10/2008 | Momosaki et al. | |
| 7,487,527 B2 | 2/2009 | Ellis et al. | |
| 7,587,601 B2 * | 9/2009 | Levy et al. ............... 713/176 |
| 7,604,172 B2 | 10/2009 | Onogi | |
| 7,612,748 B2 | 11/2009 | Tateuchi | |
| 7,624,417 B2 | 11/2009 | Dua | |
| 7,624,916 B2 | 12/2009 | Sato et al. | |
| 7,673,297 B1 | 3/2010 | Arsenault et al. | |
| 7,797,430 B2 | 9/2010 | Ichieda | |
| 7,818,675 B2 | 10/2010 | Maruyama et al. | |
| 7,841,531 B2 | 11/2010 | Onogi | |
| 8,010,977 B2 | 8/2011 | Hogyoku | |
| 8,045,054 B2 | 10/2011 | Bishop et al. | |
| 8,186,572 B2 | 5/2012 | Herzig | |
| 8,292,166 B2 | 10/2012 | Gomez et al. | |
| 8,364,018 B2 | 1/2013 | McArdle | |
| 8,380,993 B2 * | 2/2013 | Chen et al. ............... 713/176 |
| 8,386,339 B2 | 2/2013 | Minnick et al. | |
| 8,408,466 B2 | 4/2013 | Gratton | |
| 8,427,455 B2 | 4/2013 | Matsuda | |
| 8,430,302 B2 | 4/2013 | Minnick et al. | |
| 8,439,257 B2 | 5/2013 | Beals et al. | |
| 8,443,407 B2 | 5/2013 | Gaede et al. | |
| 8,468,610 B2 | 6/2013 | Beals et al. | |
| 8,511,540 B2 | 8/2013 | Anguiano | |
| 8,534,540 B2 | 9/2013 | Gratton et al. | |
| 8,550,334 B2 | 10/2013 | Gratton et al. | |
| 8,553,146 B2 | 10/2013 | Kennedy | |
| 8,746,554 B2 | 6/2014 | Gomez et al. | |
| 8,786,410 B2 | 7/2014 | Beals et al. | |
| 8,827,150 B2 | 9/2014 | Gratton et al. | |
| 8,833,640 B2 | 9/2014 | Martch et al. | |
| 8,856,853 B2 | 10/2014 | Casagrande et al. | |
| 8,875,173 B2 | 10/2014 | Kilaru et al. | |
| 8,886,172 B2 | 11/2014 | Gomez | |
| 8,931,031 B2 | 1/2015 | Schaefer | |
| 9,092,830 B2 | 7/2015 | Gomez et al. | |
| 2001/0037297 A1 | 11/2001 | McNair | |
| 2001/0052133 A1 | 12/2001 | Pack et al. | |
| 2002/0011521 A1 | 1/2002 | Lahey et al. | |
| 2002/0027612 A1 | 3/2002 | Brill et al. | |
| 2002/0049980 A1 | 4/2002 | Hoang | |
| 2002/0112250 A1 | 8/2002 | Koplar et al. | |
| 2003/0018711 A1 | 1/2003 | Imanishi | |
| 2003/0050854 A1 | 3/2003 | Showghi et al. | |
| 2003/0077065 A1 | 4/2003 | Scholten et al. | |
| 2003/0112974 A1 * | 6/2003 | Levy ................... G06T 1/0071 380/210 |
| 2003/0121978 A1 | 7/2003 | Rubin et al. | |
| 2003/0151562 A1 | 8/2003 | Kulas | |
| 2003/0172374 A1 | 9/2003 | Vinson et al. | |
| 2003/0185417 A1 * | 10/2003 | Alattar ................ G06T 1/0064 382/100 |
| 2004/0005900 A1 | 1/2004 | Zilliacus | |
| 2004/0019691 A1 | 1/2004 | Daymond et al. | |
| 2004/0026508 A1 | 2/2004 | Nakajima et al. | |
| 2004/0044532 A1 | 3/2004 | Karstens | |
| 2004/0046790 A1 | 3/2004 | Agarwal et al. | |
| 2005/0009564 A1 | 1/2005 | Hayaashi et al. | |
| 2005/0011958 A1 | 1/2005 | Fukasawa et al. | |
| 2005/0015800 A1 | 1/2005 | Holcomb | |
| 2005/0015815 A1 | 1/2005 | Shoff et al. | |
| 2005/0055281 A1 | 3/2005 | Williams | |
| 2005/0059339 A1 | 3/2005 | Honda et al. | |
| 2005/0097618 A1 | 5/2005 | Arling et al. | |
| 2005/0107135 A1 | 5/2005 | Deeds et al. | |
| 2005/0125301 A1 | 6/2005 | Muni | |
| 2005/0149967 A1 | 7/2005 | Hanley et al. | |
| 2005/0163483 A1 * | 7/2005 | Rassool ................ H04N 5/913 386/257 |
| 2005/0180804 A1 | 8/2005 | Andrew et al. | |
| 2005/0203854 A1 | 9/2005 | Das | |
| 2005/0262548 A1 | 11/2005 | Shimojo et al. | |
| 2005/0264694 A1 | 12/2005 | Ilan et al. | |
| 2006/0064700 A1 | 3/2006 | Ludvig et al. | |
| 2006/0065733 A1 | 3/2006 | Lee et al. | |
| 2006/0071076 A1 | 4/2006 | Tamayama | |
| 2006/0079247 A1 | 4/2006 | Ritter | |
| 2006/0086796 A1 | 4/2006 | Onogi | |
| 2006/0095286 A1 | 5/2006 | Kimura | |
| 2006/0124742 A1 | 6/2006 | Rines et al. | |
| 2006/0196950 A1 | 9/2006 | Kiliccote | |
| 2006/0203339 A1 | 9/2006 | Kleinberger et al. | |
| 2006/0208088 A1 | 9/2006 | Sekiguchi | |
| 2006/0265731 A1 | 11/2006 | Matsuda | |
| 2007/0008344 A1 | 1/2007 | Medina | |
| 2007/0011709 A1 | 1/2007 | Katz et al. | |
| 2007/0016934 A1 | 1/2007 | Okada et al. | |
| 2007/0016936 A1 | 1/2007 | Okada et al. | |
| 2007/0017350 A1 | 1/2007 | Uehara | |
| 2007/0019215 A1 | 1/2007 | Yu | |
| 2007/0063050 A1 | 3/2007 | Attia et al. | |
| 2007/0073585 A1 | 3/2007 | Apple et al. | |
| 2007/0143788 A1 | 6/2007 | Abernathy et al. | |
| 2007/0174198 A1 | 7/2007 | Kasahara et al. | |
| 2007/0192723 A1 | 8/2007 | Anzelde et al. | |
| 2007/0200335 A1 | 8/2007 | Tuschel | |
| 2007/0206020 A1 | 9/2007 | Duffield et al. | |
| 2007/0256118 A1 | 11/2007 | Nomura et al. | |
| 2007/0288594 A1 | 12/2007 | Philyaw et al. | |
| 2008/0022323 A1 | 1/2008 | Koo | |
| 2008/0059998 A1 | 3/2008 | McClenny et al. | |
| 2008/0062164 A1 | 3/2008 | Bassi et al. | |
| 2008/0073434 A1 | 3/2008 | Epshteyn et al. | |
| 2008/0077324 A1 | 3/2008 | Hatano et al. | |
| 2008/0082684 A1 | 4/2008 | Gaos et al. | |
| 2008/0092154 A1 | 4/2008 | Hogyoku | |
| 2008/0112615 A1 | 5/2008 | Obrea et al. | |
| 2008/0156879 A1 | 7/2008 | Melick et al. | |
| 2008/0182561 A1 | 7/2008 | Kim et al. | |
| 2008/0189185 A1 | 8/2008 | Matsuo et al. | |
| 2008/0200153 A1 | 8/2008 | Fitzpatrick et al. | |
| 2008/0200160 A1 | 8/2008 | Fitzpatrick et al. | |
| 2008/0201078 A1 | 8/2008 | Fitzpatrick et al. | |
| 2008/0244675 A1 | 10/2008 | Sako et al. | |
| 2008/0263621 A1 * | 10/2008 | Austerlitz ........ H04N 21/43615 725/139 |
| 2008/0267537 A1 | 10/2008 | Thuries | |

(56) References Cited

U.S. PATENT DOCUMENTS

| | | |
|---|---|---|
| 2008/0281624 A1 | 11/2008 | Shibata |
| 2008/0288460 A1 | 11/2008 | Poniatowski et al. |
| 2008/0288600 A1 | 11/2008 | Clark |
| 2008/0307348 A1 | 12/2008 | Jones et al. |
| 2009/0029725 A1 | 1/2009 | Kindberg |
| 2009/0031071 A1 | 1/2009 | Chiu |
| 2009/0031373 A1 | 1/2009 | Hogyoku |
| 2009/0070699 A1 | 3/2009 | Birkill et al. |
| 2009/0083808 A1 | 3/2009 | Morrison |
| 2009/0088213 A1 | 4/2009 | Rofougaran |
| 2009/0094546 A1 | 4/2009 | Anzelde et al. |
| 2009/0108057 A1* | 4/2009 | Mu et al. ............. 235/375 |
| 2009/0113334 A1 | 4/2009 | Chakra et al. |
| 2009/0116074 A1 | 5/2009 | Wilsher |
| 2009/0154759 A1 | 6/2009 | Koskinen et al. |
| 2009/0157511 A1 | 6/2009 | Spinnell et al. |
| 2009/0157530 A1 | 6/2009 | Nagamoto et al. |
| 2009/0172780 A1 | 7/2009 | Sukeda et al. |
| 2009/0179852 A1 | 7/2009 | Refai et al. |
| 2009/0180025 A1 | 7/2009 | Dawson |
| 2009/0212112 A1 | 8/2009 | Li et al. |
| 2009/0212113 A1 | 8/2009 | Chiu et al. |
| 2009/0234570 A1 | 9/2009 | Sever |
| 2009/0254954 A1 | 10/2009 | Jeong |
| 2009/0293110 A1 | 11/2009 | Koga |
| 2009/0294538 A1* | 12/2009 | Wihlborg et al. ............. 235/454 |
| 2009/0303036 A1 | 12/2009 | Sahuguet |
| 2009/0307232 A1* | 12/2009 | Hall ............. 707/10 |
| 2009/0307719 A1 | 12/2009 | Clark et al. |
| 2009/0312105 A1 | 12/2009 | Koplar |
| 2009/0320066 A1 | 12/2009 | Soldan et al. |
| 2010/0001072 A1 | 1/2010 | Onogi |
| 2010/0017457 A1 | 1/2010 | Jumpertz et al. |
| 2010/0020970 A1 | 1/2010 | Liu et al. |
| 2010/0026721 A1 | 2/2010 | Park et al. |
| 2010/0031162 A1 | 2/2010 | Wiser et al. |
| 2010/0036936 A1 | 2/2010 | Cox et al. |
| 2010/0053339 A1 | 3/2010 | Aaron et al. |
| 2010/0081375 A1 | 4/2010 | Rosenblatt et al. |
| 2010/0089996 A1 | 4/2010 | Koplar |
| 2010/0096448 A1 | 4/2010 | Melick et al. |
| 2010/0103018 A1 | 4/2010 | Yoon et al. |
| 2010/0114715 A1 | 5/2010 | Schuster et al. |
| 2010/0129057 A1 | 5/2010 | Kulkarni |
| 2010/0131900 A1 | 5/2010 | Spetalnick |
| 2010/0131970 A1 | 5/2010 | Falcon |
| 2010/0131983 A1 | 5/2010 | Shannon et al. |
| 2010/0138344 A1 | 6/2010 | Wong |
| 2010/0149187 A1 | 6/2010 | Slavin et al. |
| 2010/0154035 A1 | 6/2010 | Damola et al. |
| 2010/0161437 A1 | 6/2010 | Pandey |
| 2010/0163613 A1 | 7/2010 | Bucher et al. |
| 2010/0169935 A1 | 7/2010 | Abbruzzese |
| 2010/0188514 A1 | 7/2010 | Sato et al. |
| 2010/0201894 A1 | 8/2010 | Nakayama et al. |
| 2010/0205628 A1 | 8/2010 | Davis et al. |
| 2010/0217663 A1 | 8/2010 | Ramer et al. |
| 2010/0225653 A1 | 9/2010 | Sao et al. |
| 2010/0261454 A1 | 10/2010 | Shenfield et al. |
| 2010/0262924 A1 | 10/2010 | Kalu |
| 2010/0262992 A1 | 10/2010 | Casagrande |
| 2010/0272193 A1 | 10/2010 | Khan et al. |
| 2010/0272420 A1 | 10/2010 | Soohoo et al. |
| 2010/0275010 A1 | 10/2010 | Ghirardi |
| 2010/0279710 A1 | 11/2010 | Dicke et al. |
| 2010/0295868 A1 | 11/2010 | Zahnert et al. |
| 2010/0301115 A1 | 12/2010 | Berkun |
| 2010/0313231 A1 | 12/2010 | Okamoto et al. |
| 2010/0319041 A1 | 12/2010 | Ellis |
| 2010/0327060 A1* | 12/2010 | Moran et al. ............. 235/440 |
| 2011/0000958 A1 | 1/2011 | Herzig |
| 2011/0007630 A1 | 1/2011 | Almhana et al. |
| 2011/0030068 A1 | 2/2011 | Imai |
| 2011/0039573 A1 | 2/2011 | Hardie |
| 2011/0058516 A1 | 3/2011 | Small et al. |
| 2011/0061003 A1 | 3/2011 | Miyazawa et al. |
| 2011/0065451 A1 | 3/2011 | Danado et al. |
| 2011/0087539 A1 | 4/2011 | Rubinstein et al. |
| 2011/0107374 A1 | 5/2011 | Roberts et al. |
| 2011/0107386 A1 | 5/2011 | De Los Reyes et al. |
| 2011/0138408 A1 | 6/2011 | Adimatyam et al. |
| 2011/0208710 A1 | 8/2011 | Lesavich |
| 2011/0258058 A1 | 10/2011 | Carroll et al. |
| 2011/0264527 A1 | 10/2011 | Fitzpatrick et al. |
| 2011/0264530 A1 | 10/2011 | Santangelo et al. |
| 2011/0282727 A1 | 11/2011 | Phan et al. |
| 2011/0314485 A1 | 12/2011 | Abed |
| 2012/0075529 A1 | 3/2012 | Wong et al. |
| 2012/0084206 A1 | 4/2012 | Mehew et al. |
| 2012/0096499 A1 | 4/2012 | Dasher et al. |
| 2012/0117232 A1 | 5/2012 | Brown et al. |
| 2012/0127110 A1 | 5/2012 | Amm et al. |
| 2012/0128267 A1 | 5/2012 | Dugan et al. |
| 2012/0130835 A1* | 5/2012 | Fan et al. ............. 705/26.1 |
| 2012/0130851 A1 | 5/2012 | Minnick et al. |
| 2012/0131416 A1 | 5/2012 | Dugan et al. |
| 2012/0137318 A1 | 5/2012 | Kilaru et al. |
| 2012/0138671 A1 | 6/2012 | Gaede et al. |
| 2012/0139826 A1 | 6/2012 | Beals et al. |
| 2012/0139835 A1 | 6/2012 | Morrison et al. |
| 2012/0142322 A1 | 6/2012 | Gomez |
| 2012/0151293 A1 | 6/2012 | Beals |
| 2012/0151524 A1 | 6/2012 | Kilaru et al. |
| 2012/0153015 A1 | 6/2012 | Gomez et al. |
| 2012/0153017 A1 | 6/2012 | Bracalente et al. |
| 2012/0155838 A1 | 6/2012 | Gerhards et al. |
| 2012/0158919 A1 | 6/2012 | Aggarwal et al. |
| 2012/0159563 A1 | 6/2012 | Gomez et al. |
| 2012/0167133 A1* | 6/2012 | Carroll ............. G06Q 30/0251 725/32 |
| 2012/0168493 A1* | 7/2012 | Worms ............. 235/375 |
| 2012/0168510 A1 | 7/2012 | Gratton |
| 2012/0169928 A1 | 7/2012 | Casagrande et al. |
| 2012/0175416 A1 | 7/2012 | Gomez et al. |
| 2012/0181329 A1 | 7/2012 | Gratton et al. |
| 2012/0182320 A1 | 7/2012 | Beals et al. |
| 2012/0188112 A1 | 7/2012 | Beals et al. |
| 2012/0188442 A1 | 7/2012 | Kennedy |
| 2012/0198572 A1 | 8/2012 | Beals et al. |
| 2012/0199643 A1 | 8/2012 | Minnick et al. |
| 2012/0206648 A1 | 8/2012 | Casagrande et al. |
| 2012/0215830 A1 | 8/2012 | Anguiano |
| 2012/0217292 A1 | 8/2012 | Gratton et al. |
| 2012/0217293 A1 | 8/2012 | Martch et al. |
| 2012/0218470 A1 | 8/2012 | Schaefer |
| 2012/0222055 A1 | 8/2012 | Schaefer et al. |
| 2012/0222071 A1 | 8/2012 | Gaede et al. |
| 2012/0222081 A1 | 8/2012 | Schaefer et al. |
| 2012/0293327 A1 | 11/2012 | Mountain |
| 2012/0311623 A1 | 12/2012 | Davis et al. |
| 2013/0068838 A1 | 3/2013 | Gomez et al. |
| 2013/0239157 A1 | 9/2013 | Gaede et al. |
| 2014/0046661 A1 | 2/2014 | Bruner |
| 2014/0076963 A1 | 3/2014 | Gratton et al. |
| 2014/0158762 A1 | 6/2014 | Gomez et al. |

FOREIGN PATENT DOCUMENTS

| | | |
|---|---|---|
| CN | 1571503 A | 1/2005 |
| CN | 1636371 A | 7/2005 |
| CN | 1675930 A | 9/2005 |
| CN | 101 227 581 A | 7/2008 |
| CN | 101253504 A | 8/2008 |
| DE | 10 2007 038 810 A1 | 2/2009 |
| EP | 1 021 035 A1 | 7/2000 |
| EP | 1 383 071 A2 | 1/2004 |
| EP | 1 724 695 A1 | 11/2006 |
| EP | 1 757 222 A1 | 2/2007 |
| EP | 1 768 400 A2 | 3/2007 |
| EP | 2 079 051 A1 | 7/2009 |
| EP | 2 131 289 A1 | 12/2009 |
| EP | 2 439 936 A2 | 4/2012 |
| FR | 2 565 748 A1 | 12/1985 |
| GB | 2 044 446 A | 10/1980 |

(56) References Cited

FOREIGN PATENT DOCUMENTS

| | | | |
|---|---|---|---|
| GB | 2 165 129 A | 4/1986 | |
| GB | 2 311 451 A | 9/1997 | |
| GB | 2 325 765 A | 12/1998 | |
| GB | 2 471 567 A | 1/2011 | |
| JP | 2002-215768 A | 8/2002 | |
| JP | 2007-213548 A | 8/2007 | |
| JP | 2008 244556 A | 10/2008 | |
| KR | 2004 0087776 A | 10/2004 | |
| TW | 299433 | 3/1997 | |
| TW | 200915193 A1 | 4/2009 | |
| TW | 200926075 A | 6/2009 | |
| TW | 201032139 A | 1/2010 | |
| TW | 201038061 | 10/2010 | |
| TW | 201043039 A1 | 12/2010 | |
| WO | 95/27275 A1 | 10/1995 | |
| WO | 97/41690 A1 | 11/1997 | |
| WO | 01/06593 A2 | 1/2001 | |
| WO | 01/18589 A1 | 3/2001 | |
| WO | 01/58146 A2 | 8/2001 | |
| WO | 2005/109338 A1 | 11/2005 | |
| WO | 2007/009005 A1 | 1/2007 | |
| WO | 2009/057651 | 5/2009 | |
| WO | 2009/116954 A2 | 9/2009 | |
| WO | 2009/144536 A1 | 12/2009 | |
| WO | 2010/149161 A1 | 12/2010 | |
| WO | 2011/009055 A2 | 1/2011 | |

OTHER PUBLICATIONS

Kalker, Ton. "System issues in digital image and video watermarking for copy protection." Multimedia Computing and Systems, 1999. IEEE International Conference on. vol. 1. (pp. 562-567). IEEE, 1999.*

Berrani, Sid-Ahmed, Patrick Lechat, and Gaël Manson. "TV broadcast macro-segmentation: Metadata-based vs. content-based approaches." Proceedings of the 6th ACM international conference on Image and video retrieval. (pp. 325-332). ACM, 2007.*

"Android App Reviews & Showcase Just a Tapp Away," Android Tapp, 10 pp. Found online at http://www.androidtapp.com/download-the-weather-channel-android-app-from-your-tv/, Oct. 22, 2010.

"Can Mobile Barcodes Work on TV?," India and Asia Pacific Mobile Industry Reports, Sep. 2009, 4 pp. Found online at http://www.gomonews.com/can-mobile-barcodes-work-on-tv/, Oct. 22, 2010.

"FOX TV Uses QR Codes," 2d Barcode Strategy, Sep. 2010, 6 pp. Found online at http://www.2dbarcodestrategy.com/2010/09/fox-tv-uses-qr-codes.html, Oct. 22, 2010.

"FOX's Fringe Uses QR Code," 2d Barcode Strategy, Oct. 2010, 4 pp. Found on the Internet at http://www.2dbarcodestrategy.com/2010/10/foxs-fringe-uses-qr-code.html, Oct. 22, 2010.

"Mobile Paths: QR Codes Come to TV," Mobile Behavior: An Omnicom Group Company, Sep. 2010, 8 pp. Found online at http://www.mobilebehavior.com/2010/09/27/mobile-paths-qr-codes-come-to-tv, Oct. 22, 2010.

"What Can I Do with the QR Barcode," Search Magnet Local-QR Barcode Technology, 2 pp. Found online at http://www.searchmagnetlocal.com/qr_barcode_technology.html, Oct. 22, 2010.

Kartina Costedio, "Bluefly QR Codes Debut on TV," 2 pp. Found online at http://www.barcode.com/Mobile-Barcode-News/bluefly-qr-codes-debut-on-tv.html, Oct. 22, 2010.

Gao, J. et al., "A 2D Barcode-Based Mobile Payment System," Multimedia and Ubiquitous Engineering, 2009, 10 pp. Found online at http://ieeexplore.ieee.org/Xplore/login.jsp?url=http%3A%2F%2Fieeexplore.ieee.org%2Fie . . . , Oct. 22, 2010.

Smith, Lindsay, "Barcodes Make History on Global TV", 3 pp. Found online at http://www.lindsaysmith.com/worlds-first-mobio-mini-telethon/, Oct. 22, 2010.

Nghee, Seah Y. , "Data Transmission Between PDA and PC Using WIFI for Pocket Barcode Application", Thesis, University Teknologi Malaysia, May 2007, 126 pp. Found online at http://eprints.utm.my/6421/1/SeahYeowNgeeMFKE20007TTT.pdf, Oct. 22, 2010.

Olson, Elizabeth, "Bar Codes Add Detail on Items in TV Ads," New York Times, Sep. 2010, 3 pp. Found online at http:www.nytimes.com/2010/09/27/business/media/27bluefly.html?src=busln, Oct. 22, 2010.

Rekimoto, Jun et al., "Augment-able Reality: Situated Communication Through Physical and Digital Spaces", Sony Computer Science Laboratory, 2002, 8 pp. Found online at Citeseer: 10.1.1.20.34[1].pdf, Oct. 22, 2010.

Silverstein, Barry, "QR Codes and TV Campaigns Connect," ReveNews, Sep. 2010, 5 pp. Found online at http://www.revenews.com/barrysilverstein/qr-codes-and-tv-campaigns-connect/, Oct. 22, 2010.

Yamanari, Tomofumi et al., "Electronic Invisible Code Display Unit for Group Work on Reminiscence Therapy," Proceedings of the International MultiConference of Engineers and Computer Scientists 2009, vol. I, IMECS 2009, Mar. 2009, 6 pp. Retrieved from Internet: http://citeseerx.ist.psu.edu/viewdoc/download?doi=10.1.1.148.6904&rep1&type=pdf.

Byford, D., "Universal Interactive Device," International Business Machines Corporation, Jun. 1998, 1 page.

International Search Report and Written Opinion of PCT/US11/60094 mailed on Mar. 30, 2012, 7 pages.

International Search Report of PCT/US11/60109 mailed on Feb. 14, 2012, 3 pages.

International Search Report and Written Opinion of PCT/US2011/068161 mailed on Jun. 14, 2012, 19 pages.

International Search Report and Written Opinion of PCT/US2012/021657 mailed on May 23, 2012, 12 pages.

International Search Report and Written Opinion of PCT/US2012/022405 mailed on Apr. 19, 2012, 11 pages.

International Search Report and Written Opinion of PCT/US2012/024923 mailed on May 22, 2012, 12 pages.

International Search Report and Written Opinion of PCT/US2012/024956 mailed on Jun. 11, 2012, 10 pages.

International Search Report and Written Opinion of PCT/US2012/025502 mailed Jun. 8, 2012, 13 pages.

International Search Report and Written Opinion of PCT/US2012/025607 mailed Jun. 8, 2012, 13 pages.

International Search Report and Written Opinion of PCT/US2012/025634 mailed on May 7, 2012, 8 pages.

International Search Report and Written Opinion of PCT/US2012/026373 mailed Jun. 13, 2012, 14 pages.

International Search Report and Written Opinion of PCT/US2012/026722 mailed Jun. 28, 2012, 11 pages.

Schmitz, A., et al., "Ad-Hoc Multi-Displays for Mobile Interactive Applications," 31st Annual Conference of the European Association for Computer Graphics (Eurographics 2010), May 2010, vol. 29, No. 2, 8 pages.

Yang, C., et al., "Embedded Digital Information Integrated by Video-on-Demand System," Proceedings of the Fourth International Conference on Networked Computing and Advanced Information Management, IEEE Computer Society, 2008, 6 pages.

U.S. Appl. No. 12/971,349, filed Dec. 17, 2010, Office Action mailed Jul. 16, 2012, 11 pages.

U.S. Appl. No. 12/984,385, filed Jan. 4, 2011, Office Action mailed Jul. 12, 2012, 16 pages.

U.S. Appl. No. 12/986,721, filed Jan. 7, 2011, Notice of Allowance mailed Jun. 21, 2012, 7 pages.

U.S. Appl. No. 13/020,678, filed Feb. 3, 2011, Office Action mailed Jul. 30, 2012, 15 pages.

U.S. Appl. No. 13/035,525, filed Feb. 25, 2011, Office Action mailed Jul. 18, 2012, 15 pages.

International Search Report and Written Opinion of PCT/US11/59977 mailed on Mar. 19, 2012, 7 pages.

International Search Report and Written Opinion of PCT/US11/60002 mailed on Feb. 15, 2012, 7 pages.

International Search Report and Written Opinion of PCT/US11/60104 mailed on Mar. 29, 2012, 9 pages.

International Search Report and Written Opinion of PCT/US11/60121 mailed on Feb. 14, 2012, 7 pages.

(56) References Cited

OTHER PUBLICATIONS

International Search Report and Written Opinion of PCT/US11/61074 mailed on Jan. 6, 2012, 11 pages.
International Search Report and Written Opinion of PCT/US11/61211 mailed on Mar. 29, 2012, 8 pages.
International Search Report and Written Opinion of PCT/US11/61773 mailed on Feb. 21, 2012, 7 pages.
International Search Report and Written Opinion of PCT/US11/61778 mailed on Mar. 2, 2012, 7 pages.
International Search Report and Written Opinion of PCT/US11/63111 mailed on Apr. 4, 2012, 9 pages.
International Search Report and Written Opinion of PCT/US11/64709 mailed on Apr. 10, 2012, 8 pages.
International Search Report and Written Opinion of PCT/US2011/060098 mailed on Mar. 29, 2012, 10 pages.
International Search Report and Written Opinion of PCT/US2011/063308 mailed on Mar. 29, 2012, 10 pages.
International Search Report and Written Opinion of PCT/US2011/068176 mailed on Mar. 29, 2012, 15 pages.
Ngee, S., "Data Transmission Between PDA and PC Using WiFi for Pocket Barcode Application," Thesis, University Teknologi Malaysia, May 2007, 126 pp. Found online at http://eprints.utm.my/6421/1/SeahYeowNgeeMFKE20007TTT.pdf, Oct. 22, 2010.
U.S. Appl. No. 12/961,369, filed Dec. 6, 2010, Office Action mailed Mar. 9, 2012, 17 pages.
U.S. Appl. No. 12/971,349, filed Dec. 17, 2010, Office Action mailed Nov. 10, 2011, 9 pages.
U.S. Appl. No. 12/971,349, filed Dec. 17, 2010, Final Office Action mailed Jan. 20, 2012, 10 pages.
U.S. Appl. No. 12/986,721, filed Jan. 7, 2011, Office Action mailed Mar. 16, 2012, 6 pages.
Extended European Search Report for EP 12152690.9 dated Jun. 19, 2012, 9 pages.
International Search Report and Written Opinion of PCT/US2012/026624 mailed Aug. 29, 2012, 14 pages.
U.S. Appl. No. 12/958,073, filed Dec. 1, 2010, Office Action mailed Aug. 31, 2012, 12 pages.
U.S. Appl. No. 12/961,369, filed Dec. 6, 2010, Final Rejection mailed Oct. 30, 2012, 17 pages.
U.S. Appl. No. 12/971,349, filed Dec. 7, 2010, Final Rejection mailed Oct. 24, 2012, 11 pages.
U.S. Appl. No. 12/953,227, filed Nov. 23, 2010, Office Action mailed Nov. 7, 2012, 31 pages.
U.S. Appl. No. 13/015,382, filed Jan. 27, 2011, Office Action Mailed Nov. 13, 2012, 7 pages.
U.S. Appl. No. 13/016,483, filed Jan. 28, 2011 Office Action mailed Nov. 2, 2012, 18 pages.
U.S. Appl. No. 12/953,273, filed Nov. 23, 2010, Notice of Allowance, mailed Oct. 18, 2012, 11 pages.
U.S. Appl. No. 13/034,482, filed Feb. 24, 2011, Office Action mailed Oct. 19, 2012, 11 pages.
U.S. Appl. No. 12/960,285, filed Dec. 3, 2010, Final Office Action mailed Dec. 6, 2012, 17 pages.
U.S. Appl. No. 13/037,312, filed Feb. 28, 2011, Office Action mailed Aug. 15, 2012, 9 pages.
O'Sullivan, "Can Mobile Barcodes Work on TV?," India and Asia Pacific Mobile Industry Reports, Sep. 2009, 4 pp. Found online at http://gomonews.com/can-mobile-barcodes-work-on-tv/, Feb. 5, 2013.
International Preliminary Report on Patentability of PCT/US2011/059977 mailed on Jun. 6, 2013, 6 pages.
International Preliminary Report on Patentability of PCT/US2011/068161 mailed on Jul. 25, 2013, 13 pages.
International Search Report of PCT/US2012/022581 mailed on Oct. 8, 2012, 18 pages.
International Preliminary Report on Patentability of PCT/US2012/025502 mailed Sep. 6, 2013, 9 pages.
International Search Report and Written Opinion of PCT/US2012/048032, mailed Oct. 16, 2012, 13 pages.
Liu, Yue et al., "Recognition of QR code with mobile phones," Control and Decision Conference, 2008. CCDC 2008. Jul. 2-4, 2008, pp. 203-206.
U.S. Appl. No. 12/958,073, filed Dec. 1, 2010, Notice of Allowance mailed Jan. 17, 2013, 17 pages.
U.S. Appl. No. 12/964,478, filed Dec. 9, 2010, Non-Final Office Action mailed Mar. 26, 2013, 19 pages.
U.S. Appl. No. 12/964,478, filed Dec. 9, 2010, Final Office Action mailed Sep. 16, 2013, 12 pages.
U.S. Appl. No. 12/961,369, filed Dec. 6, 2010, Non-Final Office Action mailed Mar. 25, 2013, 17 pages.
U.S. Appl. No. 12/961,369, filed Dec. 6, 2010, Non-Final Office Action mailed Jul. 12, 2013, 22 pages.
U.S. Appl. No. 12/971,349, filed Dec. 7, 2010, Notice of Allowance mailed Oct. 2, 2013, 24 pages.
U.S. Appl. No. 12/981,244, filed Dec. 29, 2010, Office Action mailed Dec. 21, 2012, 23 pages.
U.S. Appl. No. 12/981,244, filed Dec. 29, 2010, Final Office Action mailed Oct. 30, 2013, 10 pages.
U.S. Appl. No. 12/984,385, filed Jan. 4, 2011, Notice of Allowance mailed Nov. 28, 2012, 11 pages.
U.S. Appl. No. 12/953,227, filed Nov. 23, 2010, Final Office Action mailed May 24, 2013, 17 pages.
U.S. Appl. No. 13/015,382, filed Jan. 27, 2011, Notice of Allowance mailed Feb. 22, 2013, 12 pages.
U.S. Appl. No. 13/016,483, filed Jan. 28, 2011 Final Office Action mailed Jun. 27, 2013, 13 pages.
U.S. Appl. No. 12/965,645, filed Dec. 10, 2010, Non-Final Office Action, mailed Jul. 19, 2013, 20 pages.
U.S. Appl. No. 12/973,431, filed Dec. 20, 2010, Non-Final Rejection mailed May 15, 2013, 30 pages.
U.S. Appl. No. 12/973,431, filed Dec. 20, 2010, Final Office Action mailed Aug. 27, 2013, 11 pages.
U.S. Appl. No. 13/007,317, filed Jan. 14, 2011, Office action mailed Dec. 19, 2012, 29 pages.
U.S. Appl. No. 13/010,557, filed Jan. 20, 2011, Final Rejection mailed Jan. 16, 2014, 17 pages.
U.S. Appl. No. 13/010,557, filed Jan. 20, 2011, Non-Final Rejection mailed Aug. 5, 2013, 17 pages.
U.S. Appl. No. 13/014,591, Notice of Allowance mailed May 24, 2013, 32 pages.
U.S. Appl. No. 13/020,678, filed Feb. 3, 2011, Notice of Allowance mailed Jan. 3, 2013, 13 pages.
U.S. Appl. No. 13/007,317, Notice of Allowance mailed May 13, 2013, 16 pages.
U.S. Appl. No. 13/028,030, filed Feb. 15, 2011, Office Action mailed Jan. 11, 2013, 14 pages.
U.S. Appl. No. 13/031,115, Notice of Allowance mailed Apr. 16, 2013, 24 pages.
U.S. Appl. No. 13/034,482, filed Feb. 24, 2011, Final Office Action mailed Apr. 25, 2013, 19 pages.
U.S. Appl. No. 12/960,285, filed Dec. 3, 2010, Final Office Action mailed Apr. 18, 2013, 14 pages.
U.S. Appl. No. 13/006,270, filed Jan. 13, 2011, Non-Final Office Action mailed Oct. 8, 2013, 20 pages.
U.S. Appl. No. 13/028,030, filed Feb. 15, 2011, Non-Final Office Action mailed Dec. 17, 2013, 60 pages.
U.S. Appl. No. 13/035,525, filed Feb. 25, 2011, Final Office Action mailed Jan. 31, 2013, 26 pages.
U.S. Appl. No. 13/035,525, filed Feb. 25, 2011, Non-Final Office Action mailed May 15, 2013, 15 pages.
U.S. Appl. No. 13/035,525, filed Feb. 25, 2011, Final Office Action mailed Sep. 12, 2013, 21 pages.
U.S. Appl. No. 13/037,302, filed Feb. 28, 2011 Office Action mailed Mar. 1, 2013, 20 pages.
U.S. Appl. No. 13/037,302, filed Feb. 28, 2011 Final Office Action mailed Oct. 16, 2013, 28 pages.
U.S. Appl. No. 13/037,312, filed Feb. 28, 2011, Final Office Action mailed Feb. 28, 2013, 18 pages.
U.S. Appl. No. 13/037,316, filed Feb. 28, 2011, Office Action mailed Jan. 30, 2013, 21 pages.
U.S. Appl. No. 13/037,316, filed Feb. 28, 2011, Final Office Action mailed Aug. 28, 2013, 13 pages.

(56) References Cited

OTHER PUBLICATIONS

U.S. Appl. No. 13/037,333, filed Feb. 28, 2011 Notice of Allowance mailed Jan. 18, 2013, 27 pages.
U.S. Appl. No. 13/192,287, filed Jul. 27, 2011 Final Office Action mailed Jan. 28, 2014, 18 pages.
U.S. Appl. No. 13/192,287, filed Jul. 27, 2011 Non Final Office Action mailed Jun. 13, 2013, 22 pages.
U.S. Appl. No. 13/673,480, filed Nov. 9, 2012 Office Action mailed Jan. 16, 2013, 27 pages.
U.S. Appl. No. 13/673,480, filed Nov. 9, 2012 Final Office Action mailed Sep. 9, 2013, 10 pages.
U.S. Appl. No. 13/673,480, filed Nov. 9, 2012 Notice of Allowance mailed Nov. 12, 2013, 16 pages.
U.S. Appl. No. 13/475,794, filed May 18, 2012 Non-Final Office Action mailed Sep. 18, 2013, 19 pages.
Extended European Search Report for EP 11842890.3 dated Mar. 26, 2014, 8 pages.
Extended European Search Report for EP 11850819.1 dated Mar. 17, 2014, 5 pages.
Extended European Search Report for EP 11846486 dated Mar. 26, 2014, 5 pages.
Extended European Search Report for EP 11852630 dated Jun. 30, 2014, 7 pages.
International Preliminary Report on Patentability of PCT/US2012/048032 mailed on Apr. 3, 2014, 6 pages.
International Preliminary Report on Patentability of PCT/US2011/063111 mailed Jun. 13, 2013, 8 pages.
Kato et al, "2D barcodes for mobile phones", Mobile Technology, Applications and Systems, 2005 2nd International Conference on Guangzhou, China Nov. 15-17, 2005, Piscataway, NJ, USA, IEEE, Piscataway, NJ, USA, Nov. 15, 2005, pp. 8 pp. 8, XP031887368, DOI: 10.1109/MTAS.2005.207166; ISBN: 978-981-05-4573-4, 8 pages.
Office Action and Search Report for ROC (Taiwan) Patent Application No. 10014870 dated May 7, 2014, issued in the corresponding foreign application, 9 pages.
Office Action and Search Report for ROC (Taiwan) Patent Application No. 100142966 dated May 27, 2014, 6 pages.
Office Action for European Patent Application No. 12719817.4 dated Jun. 23, 2014 issued in the corresponding foreign application, 5 pages.
U.S. Appl. No. 14/179,336, filed Feb. 12, 2014, Non-Final Office Action mailed May 22, 2014, 14 pages.
U.S. Appl. No. 12/961,369, filed Dec. 6, 2010, Notice of Allowance mailed Jul. 16, 2014, 15 pages.
U.S. Appl. No. 12/981,244, filed Dec. 29, 2010, Notice of Allowance mailed Mar. 25, 2014, 17 pages.
U.S. Appl. No. 12/965,645, filed Dec. 10, 2010, Final Office Action, mailed Mar. 18, 2014, 24 pages.
U.S. Appl. No. 12/965,645, filed Dec. 10, 2010, Notice of Allowance, mailed Jun. 20, 2014, 35 pages.
U.S. Appl. No. 13/028,030, filed Feb. 15, 2011, Final Office Action mailed Jul. 11, 2014, 43 pages.
U.S. Appl. No. 12/960,285, filed Dec. 3, 2010, Non-Final Office Action mailed Jun. 6, 2014, 19 pages.
U.S. Appl. No. 13/006,270, filed Jan. 13, 2011, Final Office Action mailed May 9, 2014, 41 pages.
U.S. Appl. No. 13/037,312, filed Feb. 28, 2011, Notice of Allowance mailed Jun. 13, 2013, 10 pages.
U.S. Appl. No. 13/968,611, filed Aug. 16, 2013, Notice of Allowance mailed May 2, 2014, 40 pages.
U.S. Appl. No. 12/961,369, filed Dec. 6, 2010, Non-Final Office Action mailed Feb. 13, 2014, 21 pages.
U.S. Appl. No. 13/968,611, filed Aug. 16, 2013, Non-Final Office Action mailed Jan. 17, 2014, 21 pages.
Office Action of the Intellectual Property Office for ROC Patent App. No. 100143194 dated Sep. 23, 2014, 10 pages.
Office Action of the Intellectual Property Office for ROC Patent App. No. 100142978 dated Sep. 23, 2014, 9 pages.
The First Office Action for Mexican Patent Application No. MX/a/2013/007672 is not translated into English. This document is from prosecution of the corresponding foreign matter for which we do not have a translation. Dated Sep. 11, 2014, 2 pages.
The Notice of Allowance received Dec. 16, 2014 for Mexican Patent Application No. MX/a/2013/009882 is not translated into English, 1 page.
U.S. Appl. No. 14/179,336, filed Feb. 12, 2014, Final Office Action mailed Dec. 1, 2014, 30 pages.
U.S. Appl. No. 13/475,794, filed May 18, 2012, Non-Final Office Action mailed Nov. 21, 2014, 33 pages.
U.S. Appl. No. 13/302,717, filed Nov. 22, 2011, Non-Final Rejection mailed Dec. 18, 2014, 71 pages.
U.S. Appl. No. 13/016,483, filed Jan. 28, 2011, Non-Final Office Action mailed Nov. 3, 2014, 33 pages.
U.S. Appl. No. 12/973,431, filed Dec. 20, 2010, Non-Final Rejection mailed Dec. 19, 2014, 30 pages.
U.S. Appl. No. 12/960,285, filed Dec. 3, 2010, Final Office Action mailed Dec. 3, 2014, 19 pages.
First Office Action by the Mexican Institute of Industrial Property for Mexican Patent Application No. MX/a/2013/00988 dated Aug. 14, 2014, 3 pages.
International Preliminary Report on Patentability for PCT/US2011/060002 mailed Jun. 6, 2013, 6 pages.
International Preliminary Report on Patentability for PCT/US2011/060094 mailed Jun. 20, 2013, 6 pages.
International Preliminary Report on Patentability for PCT/US2011/060121 mailed Jun. 20, 2013, 6 pages.
International Preliminary Report on Patentability for PCT/US2011/061211 mailed Jul. 4, 2013, 7 pages.
International Preliminary Report on Patentability for PCT/US2011/061773 mailed Jun. 6, 2013, 6 pages.
International Preliminary Report on Patentability for PCT/US2011/061778 mailed Jul. 11, 2013, 6 pages.
International Preliminary Report on Patentability for PCT/US2011/060098 mailed Jun. 13, 2013, 9 pages.
International Preliminary Report on Patentability for PCT/US2011/063308 mailed Jul. 18, 2013, 9 pages.
International Preliminary Report on Patentability for PCT/US2012/022581 mailed Aug. 8, 2013, 12 pages.
International Preliminary Report on Patentability for PCT/US2012/022405 mailed Aug. 8, 2013, 7 pages.
International Preliminary Report on Patentability for PCT/US2012/024923 mailed Aug. 29, 2013, 8 pages.
International Preliminary Report on Patentability for PCT/US2012/024956 mailed Aug. 29, 2013, 7 pages.
International Preliminary Report on Patentability for PCT/US2012/025607 mailed Sep. 12, 2013, 8 pages.
International Preliminary Report on Patentability for PCT/US2012/025634 mailed Sep. 6, 2013, 5 pages.
International Preliminary Report on Patentability for PCT/US2012/026373 mailed Sep. 12, 2013, 10 pages.
International Preliminary Report on Patentability for PCT/US2012/026624 mailed Sep. 12, 2013, 12 pages.
International Preliminary Report on Patentability for PCT/US2011/060109 mailed Jun. 20, 2013, 7 pages.
Office Action of the Intellectual Property Office for ROC Patent App. No. 101101486, dated Aug. 5, 2014, 4 pages.
The First Office Action for Mexican Patent Application No. MX/a/2013/006262 is not translated into English. This document is from prosecution of the corresponding foreign matter for which we do not have a translation. Dated Aug. 7, 2014, 2 pages.
Publication of PCT/US2011/059977 by the India Controller General of Patents Designs and Trademarks as India Patent Publication No. 4694/CHENP/2013 A on Sep. 5, 2014, 1 page.
Publication of PCT/US2012/025634 by the India General Patents Designs and Trademarks as India Patent Publication No. 6967/CHENP/2013 A on Aug. 1, 2014, 1 page.
U.S. Appl. No. 13/034,482, filed Feb. 24, 2011 Notice of Allowance mailed Aug. 29, 2014, 45 pages.
U.S. Appl. No. 13/006,270, filed Jan. 13, 2011 Non-Final Office Action mailed Sep. 12, 2014, 41 pages.

(56) References Cited

OTHER PUBLICATIONS

Jung, Eui-Hyun et al., "A Robust Digital Watermarking System Adopting 2D Barcode against Digital Piracy on P2P Network," IJCSNA International Journal of Computer Science and Network Security, vol. 6, No. 10, Oct. 2006, 6 pages.
Office Action dated Feb. 18, 2015 for Mexican Patent Application No. MX/a/2013/009794, 1 page.
Office Action dated Feb. 10, 2015 for Mexican Patent Application No. MX/a/2013/006770, 2 pages.
Office Action dated Feb. 6, 2015 for Mexican Patent Application No. MX/a/2013/006520, 2 pages.
Office Action and Search Report for ROC (Taiwan) Patent Application No. 100149344 issued Jan. 23, 2015, 8 pages.
Office Action for European Patent Application No. 12707435.9 dated Mar. 12, 2015, 6 pages.
U.S. Appl. No. 12/953,227, filed Nov. 23, 2010, Non Final Office action mailed Mar. 24, 2015, 39 pages.
U.S. Appl. No. 13/006,270, filed Jan. 13, 2011, Final Office Action mailed Mar. 23, 2014, 51 pages.
First Examination Report from European Patent Office dated Feb. 4, 2015 for EP 12716751.8, 4 pages.
The First Office Action dated Nov. 12, 2014 for Mexican Patent Application No. MX/a/2013/009794 is not translated into English, 2 pages.
Office Action dated Jan. 28, 2015 for Mexican Patent Application No. MX/a/2013/006973 is not translated into English, 3 pages.
Office Action from European Patent Office for Application No. 12716728.6 dated Feb. 26, 2015, 4 pages.
European Search Report for EP 11844504 dated Feb. 24, 2015, 10 pages.
First Office Action by the Mexican Institute of Industrial Property for Mexican Patent Application No. MX/a/2013/009881 dated Aug. 14, 2014, 3 pages.
U.S. Appl. No. 14/179,336, filed Feb. 12, 2014 Notice of Allowance mailed Feb. 18, 2015, 15 pages.
U.S. Appl. No. 13/028,030, filed Feb. 15, 2011, Non-Final Office Action mailed Feb. 6, 2015, 56 pages.
First Examination Report from European Patent Office dated May 18, 2015 for EP 11849496.2, 7 pages.
European Office Action for EP 11842890.3 dated Mar. 13, 2015, 8 pages.
European Search Report for EP 11855065 dated Mar. 6, 2014, 6 pages.
Office Action for EP 11855065 dated Mar. 13, 2015, 6 pages.
Notice of Allowance by the Mexican Institute of Industrial Property for Mexican Patent Application No. MX/a/2013/009881 dated Jan. 12, 2015, 1 page.
First Office Action for CN 201180065044.7 issued Feb. 13, 2015 by the State Intellectual Property Office, 4 pages.
U.S. Appl. No. 13/475,794, filed May 18, 2012 Final Office Action mailed Jun. 1, 2015, 45 pages.
U.S. Appl. No. 13/302,717, filed Nov. 22, 2011 Final Rejection mailed May 8, 2015, 44 pages.
U.S. Appl. No. 13/037,302, filed Feb. 28, 2011 Final Office Action mailed May 4, 2015, 54 pages.
U.S. Appl. No. 13/016,483, filed Jan. 28, 2011 Final Office Action mailed May 13, 2015, 34 pages.
U.S. Appl. No. 12/973,431, filed Dec. 20, 2010 Notice of Allowance mailed May 28, 2015, 20 pages.
U.S. Appl. No. 12/960,285, filed Dec. 3, 2010 Non-Final Office Action mailed May 14, 2015, 21 pages.
Office Action from European Patent Office for Application No. 11852630.0 dated May 12, 2015, 7 pages.
Notice of Allowance and search report for ROC (Taiwan) Patent Application No. 101106288 received May 29, 2015, 9 pages.
Office Action from State Intellectual Property Office for CN Appln. No. 201180056242.7 received Jun. 17, 2015, 10 pages.
Office Action and Search Report from the State Intellectual Property Office for CN Pat. Appln. No. 201180066584.7 issued on Jul. 10, 2015, 12 pages.
Office Action dated Apr. 22, 2015 for Mexican Patent Application No. MX/a/2013/009883, 2 pages.
U.S. Appl. No. 13/028,030, filed Feb. 15, 2011, Final Office Action mailed Jul. 17, 2015, 63 pages.
The Second Office Action dated Jun. 1, 2015 for Mexican Patent Application No. MX/a/2013/007672 is not translated into English, 2 pages.
The First Office Action dated Jul. 13, 2015 for Mexican Patent Application No. MX/a/2013/009791 is not translated into English, 2 pages.
U.S. Appl. No. 13/864,474, filed Apr. 17, 2013 Non Final Office Action mailed Aug. 11, 2015, 59 pages.

* cited by examiner

CONTENT SOURCE IDENTIFICATION USING MATRIX BARCODE

FIELD

The present disclosure relates generally to audiovisual content and, more specifically, to watermarking audiovisual content.

BACKGROUND

Audiovisual content (e.g., television shows, movies, recorded presentations and other viewable and/or listenable programs) may be recorded and displayed multiple times, often by secondary sources. For example, users may record a television show at home and then upload a copy of the television show to the Internet. Other users may then view and/or download the television show. This transmission and viewing may be a problem because it may be unauthorized. For example, the digital file storing the television show may contain copyrighted material and the copyright owner may not authorize the user to transmit, display and/or record the television show. Therefore, it may be beneficial to digitally watermark the content to include data such as the owner's name, the date it was displayed/created, and so on. Additionally, the content owner may also desire to know information regarding the user that originally uploaded the content to the Internet or another data storage location.

SUMMARY

In one embodiment, a method implemented on a computer system is disclosed. The method may include receiving content, such as audiovisual content, on a content receiver. Then, the content receiver may generate a matrix barcode. The matrix barcode may include content data that corresponds to information regarding the content, as well as receiver data corresponding to information regarding the content receiver. Then the content receiver may create a modified or fingerprinted content. The modified content may include the matrix barcode and the content. Then, after the modified content has been created the content receiver may output the modified content to a display device.

In still other embodiments, a method for determining a source of unauthorized content is described. The method may use a computing device to access a video content from an unauthorized source. The video content may include a matrix barcode or data matrix having data corresponding to an identifier for a content receiver. Then, a display device may present the video content and the matrix barcode. As the video content and the matrix barcode are being presented, a computing device or matrix barcode reader may analyze the matrix barcode to determine an original source of the video content.

Another embodiment may take the form of a system for fingerprinting audiovisual content. The system includes a content receiver and a display device in communication with the content receiver. The content receiver is configured to receive a video signal, where the video signal includes audiovisual content. The content receiver may then be configured to generate a matrix barcode that includes identification data. The content receiver is also configured to create a fingerprinted content that includes the audiovisual content (from the video signal) and the matrix barcode. The content receiver may then be configured to output the fingerprinted content. The display device is configured to receive the fingerprinted content from the content receiver. Also, the display device is typically configured to display the fingerprinted content.

DETAILED DESCRIPTION

Various examples of a system to fingerprint audiovisual content to embed the content with data corresponding to the original source of the content and/or the original content receiver that received the audiovisual content. As non-limiting examples, content may be fingerprinted with the name of the content provider, such as HBO, a serial number of the content receiver that receives the content from a network, a name of the copyright holder, a date and time at which content is transmitted and/or received, and data regarding the owner of the content receiver. In some embodiments, a matrix barcode is embedded within audiovisual content. The matrix barcode may be generated at the content provider and/or may be generated at the content receiver (e.g., set top box, computer) when the content receiver receives the content. A content provider may include either a matrix barcode or data that may allow the content receiver to generate the matrix barcode. The content receiver may also generate a matrix barcode containing both content data and identification data, or may generate a separate identification matrix barcode. As the content is output to a display device such as a television, the content receiver may embed the matrix barcode(s) within the content.

The matrix barcode may serve as a fingerprint or identifier for the content. For example, the matrix barcode may include data such as the content owner, the date/time the content was originally broadcast, the content receiver identification number that recorded/displayed the content, the user's account tied to the content receiver and so on. This may be beneficial because if the content is transferred to another computer, network or other data storage facility, the original content receiver and the content owner may be determined. This may be especially helpful in stopping/deterring copyright violations, such as movie piracy.

In one embodiment, a content provider may provide audiovisual content to a content receiver. The content receiver may generate a matrix barcode that includes data such as a content receiver identifier, user account information (e.g., user name, account number), content-related information, and/or content provider related-information. The content receiver may then output a modified or fingerprinted content that includes the original audiovisual content and the matrix barcode. The matrix barcode may be configured to be displayed on multiple frames and therefore it may be visible to a viewer during normal playback. Or, the matrix barcode may be configured to be displayed in only a single frame, or a small number of sequential or non-sequential frames, so that it generally cannot be perceived by the human eye during normal playback. Additionally, the matrix barcode may be configured to be displayed multiple times throughout the audiovisual content or may be displayed once at a particular location of the audiovisual content.

When the matrix barcode is generated at the content receiver, the location of the content receiver, the receiver identification number, customer information and the like may be included within the matrix barcode. This is because the content receiver may be configured to store and utilize any or all of this information. Thus, the matrix barcode may act as a fingerprint as well as a watermark. In other words, the matrix barcode will not only relay information such as the content owner and/or copyright owner, but also the specific content receiver that recorded/output the audiovisual content.

Using the fingerprint, a content owner or broadcasting source, such as a broadcast satellite service, and/or cable company, may be able to determine the origin of the audiovisual content. For example, if the audiovisual content is stored at and accessible from an online content aggregator such as the web site YOUTUBE, the user who originally recorded the content from a content receiver may be determined by analyzing the matrix barcode. This may be helpful because content online is often re-posted, copied and distributed by users other than the original uploader. The matrix barcode may assist a content owner in tracking the original source of the online content. For example, if a user records a television show and then posts the television show to a content aggregator, the copyright owner of the television show may be able to track down the original user, content receiver, and/or uploading computer via the matrix barcode.

Additionally, the matrix barcode may be embedded within the digital file for the audiovisual content, so that it may be more difficult for a user to transmit the content without the matrix barcode. Therefore, as the digital file is copied, re-copied, downloaded, uploaded, or otherwise transmitted, the matrix barcode may remain a part of the file.

Figure 1:
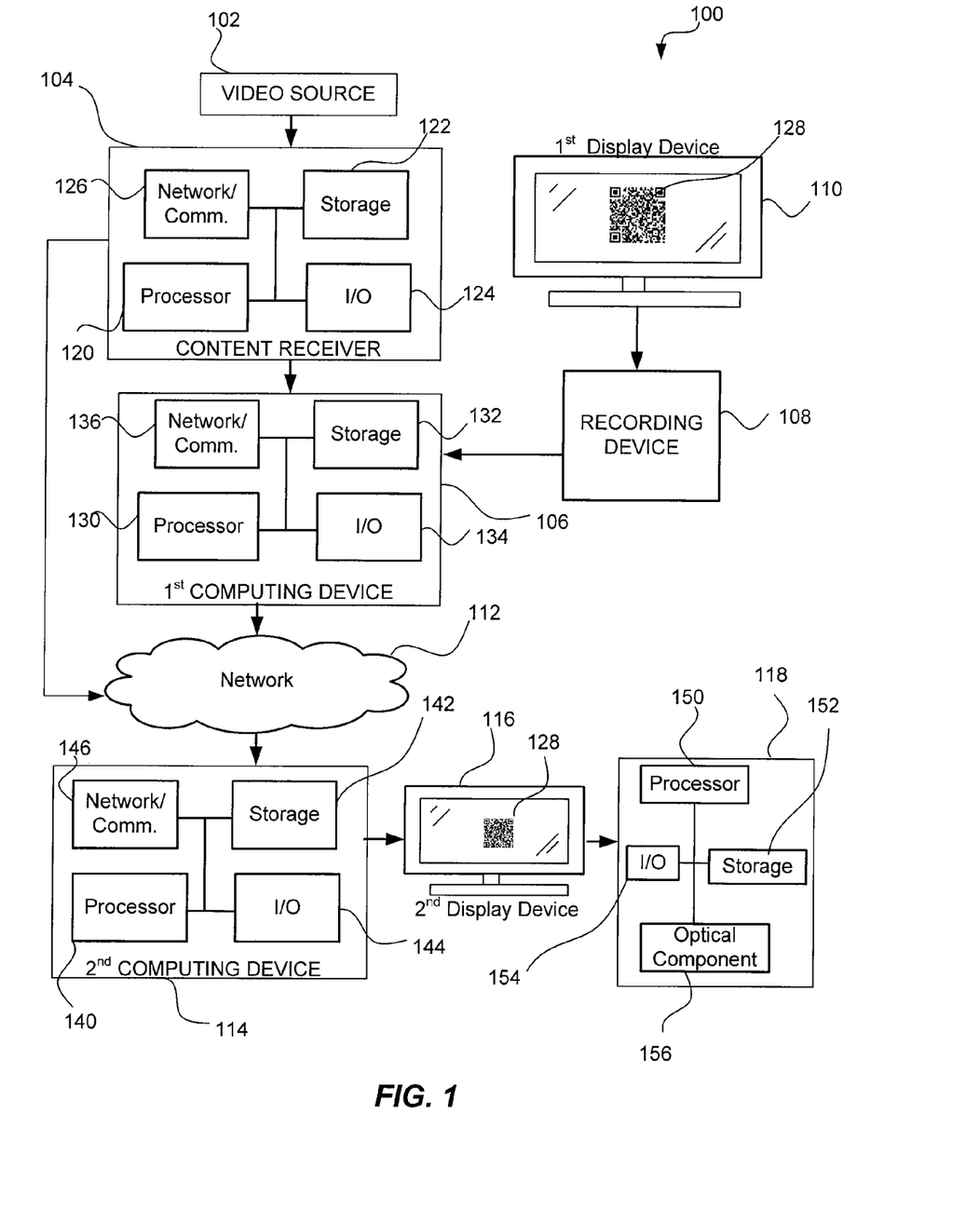
FIG. 1 is a block diagram of a system for fingerprinting content and determining a content source via the fingerprint.

FIG. 1 illustrates an embodiment of a system 100 for fingerprinting audiovisual content. The content may include video content and/or audio content. For example, the content may be television programming, movies, or the like. The system 100 may include a content source 102, such as television programming, provided to a content receiver 104 (e.g., a set top box, cable box and the like) via a transmission medium. The content receiver 104 may then provide content from the content source 102 to a display device 110, a first computing device 106, and/or a second computing device 114. Additionally the system 100 may also include a second display device 116, a reading device 118 and a network 112 to facilitate communication between various components of the system 100.

The content receiver 104 receives content from the content source 102 and then may transmit the content to the display device 110, the first computing device 106 and/or the network 112. The content receiver 104 may modify the content from the content source 102 and may include a matrix barcode 128 within the content. The matrix barcode 128 may be embedded, injected or otherwise included within the content, and as the content is transmitted from device to device, the matrix barcode 128 may be transmitted as well.

The content receiver 104 may be practically any type of computing device able to receive and process audio, video and/or data signals. For example, the content receiver 104 may be a set top box, a television receiver, a digital video recorder, or a computer. The content receiver 104 may receive practically any form/type of content from almost any number of sources, this may include the content source 102, recorded audio/video, streaming data from the Internet, downloaded data, and so on.

In some embodiments, the content receiver 104 may include a network/communication interface 126, memory storage 122, a processor 120 and an input/output interface 124 connected via a system bus. Additionally, the content receiver 104 may also include an optical drive (e.g., digital video disc player, compact disc player, high definition digital video disc player), a universal serial bus drive, or other electronic inputs. Furthermore, although the display device 110 is illustrated as separate form the content receiver 104, it should be understood that in various implementations the display device 110 may be incorporated into the content receiver 104.

The network/communication interface 126 may receive the content source 102 from a broadcast headend (not shown), the network 112 and/or other communication mechanisms. Additionally, the network/communication interface 126 may also communicate with the first computing device 106, and/or the second computing device 114 via the network 112.

The memory storage 122 may store electronic data that may be utilized by the content receiver 104. For example, the memory storage 122 may store content in the form of video/audio signals, an electronic programming guide, user preference data such as a desired language and residential time zone, or settings data. The memory storage 122 may be, for example, a magnetic storage medium, optical storage medium, magneto-optical storage medium, read only memory, random access memory, erasable programmable memory, or flash memory.

The processor 120 may control operation of the content receiver 104. The processor 120 may be any electronic device cable of processing, receiving, and/or transmitting instructions. For example, the processor 120 may be a microprocessor or a microcomputer.

The input/output interface 124 provides communication to and from the content receiver 104 to and from a variety of devices/sources. For example, the input/output interface 124 may receive data from the display device 110, a remote control, control buttons located on the content receiver 104, or other computing devices. Additionally, the input/output interface 126 may also receive/transmit data to and from an optical drive, universal serial bus (USB) drive, or other video/audio/data inputs.

The display device 110 may be in electronic communication with the content receiver 104. The display device 110 may be configured to display/output the content and/or data. For example, the display device 110 may be a television display or a computer monitor capable of displaying audio, video and data signals. The display device 110 may be any kind of electronic display such as, a cathode ray tube display, a liquid crystal display, or a plasma display.

The matrix barcode 128 may be a two-dimensional barcode with data included in both the horizontal and vertical directions, such as a QR code or matrix code. The matrix barcode 128 may consist of black blocks or modules arranged in a pattern against a white background. The information encoded within the matrix barcode 128 may be text, uniform resource indicator (URI), alphanumeric, numeric and other data. The matrix barcode 128 may be readable by the reading device 118, a barcode scanner, a digital camera, a computing device, smart phone or the like.

The recording device 108 may be in communication with the display device 110 and the first computing device 106. The recording device 108 may record the content, including the matrix barcode 128, when the content is displayed on the display device 110. For example, after the content receiver 104 transmits the fingerprinted content to the display device 110, the recording device 108 may then capture the fingerprinted content. The recording device 108 may be any device capable of recording video content. For example, the recording device 108 may be a video camera, digital camera, digital video disc recorder, videocassette recorder, and so on. Additionally, the recording device 108 may be incorporated into the display device.

After the recording device 108 records the fingerprinted content, the content and the matrix barcode 128 may be transmitted to the first computing device 106. For example, a user may download the fingerprinted content to the first computing device 106 in order to post the fingerprinted content on a website, transmit to other users, or provide access to the fingerprinted content. In some embodiments, the fingerprinted content may be transmitted directly from the content receiver 104 to the first computing device 106. For example, the content receiver 104 may transmit the fingerprinted content to the first computing device 106.

The first computing device 106 may be used to transmit the fingerprinted content via the network 112 to other computing devices or users. For example, the first computing device 106 may be used to post the fingerprinted content to a website, such as YOUTUBE, electronically mail the fingerprinted content, or otherwise transmit the fingerprinted content. The first computing device 106 may be any type of computing device, for example, a personal computer, a laptop computer, a tablet computer, a smart phone, and so on.

The first computing device 106 may include a processor 130, memory storage 132, an input/output interface 134, a network/communication interface 135 all connected via a system bus 138. The processor 130 may be substantially similar to the processor 120 in the content receiver 104. Similarly, the memory storage 132 may be substantially similar to the memory storage 122 in the content receiver 104, and the network/communication interface 136 may also be substantially similar to the network/communication interface 126 component in the content receiver 104. The input output interface 134 may receive input from various input devices (e.g., a keyboard, mouse, trackball, joystick) and produce output signals to various devices (e.g., a computer monitor, display device, speakers, and so on).

The first computing device 106 may communicate via the network 112 to the second computing device 114. Additionally, in some embodiments, the content receiver 104 may communicate with the second computing device 114 via the network 112. The second computing device 114 may download, stream or otherwise access the fingerprinted content from the network 112. The second computing device 114 may access the fingerprinted content either directly from the first computing device 106 or the content receiver 104, or the second computing device 114 may access the fingerprinted content from another computing device, server, or the like that forms part of the network 112. For example, if a user uploads the fingerprinted content to YOUTUBE, the second computing device 114 may access the fingerprinted content from another computing device (e.g., server) other than the first computing device 106 or content receiver 104.

The second computing device 114 may be substantially similar to the first computing device 106, or may be different. For example, the second computing device 114 may be practically any computing device, such as a personal computer, a laptop computer, a tablet computer, a smart phone, and so on. The second computing device 114 may include a processor unit 140, a memory storage 142, an input/output interface 144, a network/communication interface 146 all connected together via a system bus. The processor 140 may be substantially similar to the processor 130 in the first computing device 106. Similarly, the memory storage 142 may be substantially similar to the memory storage 132, the network/communication interface 148 may be substantially similar to the network/communication interface 138, and the input/output interface 144 may be substantially similar to the input/output interface 134 of the first computing device 106.

The second computing device 114 may be in communication with a second display device 116. In some embodiments, the second computing device 114 may transmit the fingerprinted content to the second display device 116. The second display device 116 may then display the fingerprinted content including the matrix barcode 128. For example, a user may download or otherwise access the fingerprinted content, and the display device 116 may then display the content and the matrix barcode 128. The second display device 116 may be substantially the same as the display device 110, or may be different. For example, the second display device 116 may be a computer monitor, a plasma display, a cathode ray tube display, or a liquid crystal display. Additionally, in some embodiments, the second display device 116 may be incorporated into the second computing device 114, such as a smart phone, tablet computer, hand held computing device, notebook computer, and the like.

After or as the content and the matrix barcode 128 are being displayed on the display device 116, a reading device 118 may capture and analyze the fingerprinted content and the matrix barcode. In some embodiments, the reading device 118 may be incorporated into the second computing device 114. In other embodiments, the reading device 118 may be a separate computing device. In these embodiments, the reading device 118 may include an optical component 156 to capture the matrix barcode 128 as it is presented. Additionally, the reading device 118 may also include a processor 150, a memory 152, and an input/output interface 154.

The network 112 provides communication paths between the content receiver 104, the first computing device 106, and the second computing device 114. The communication paths between the devices may be wireless (e.g., satellite, microwave and other electromagnetic frequencies) or wired (e.g., fiber optic wire, CAT 5 wiring, coaxial cable). In some embodiments, the network 112 may further include satellites, receivers and/or transmitters to further transmit and receive content to and from the content receiver 104, the broadcasting source, and the first and second computing devices 106, 114.

Figure 2:
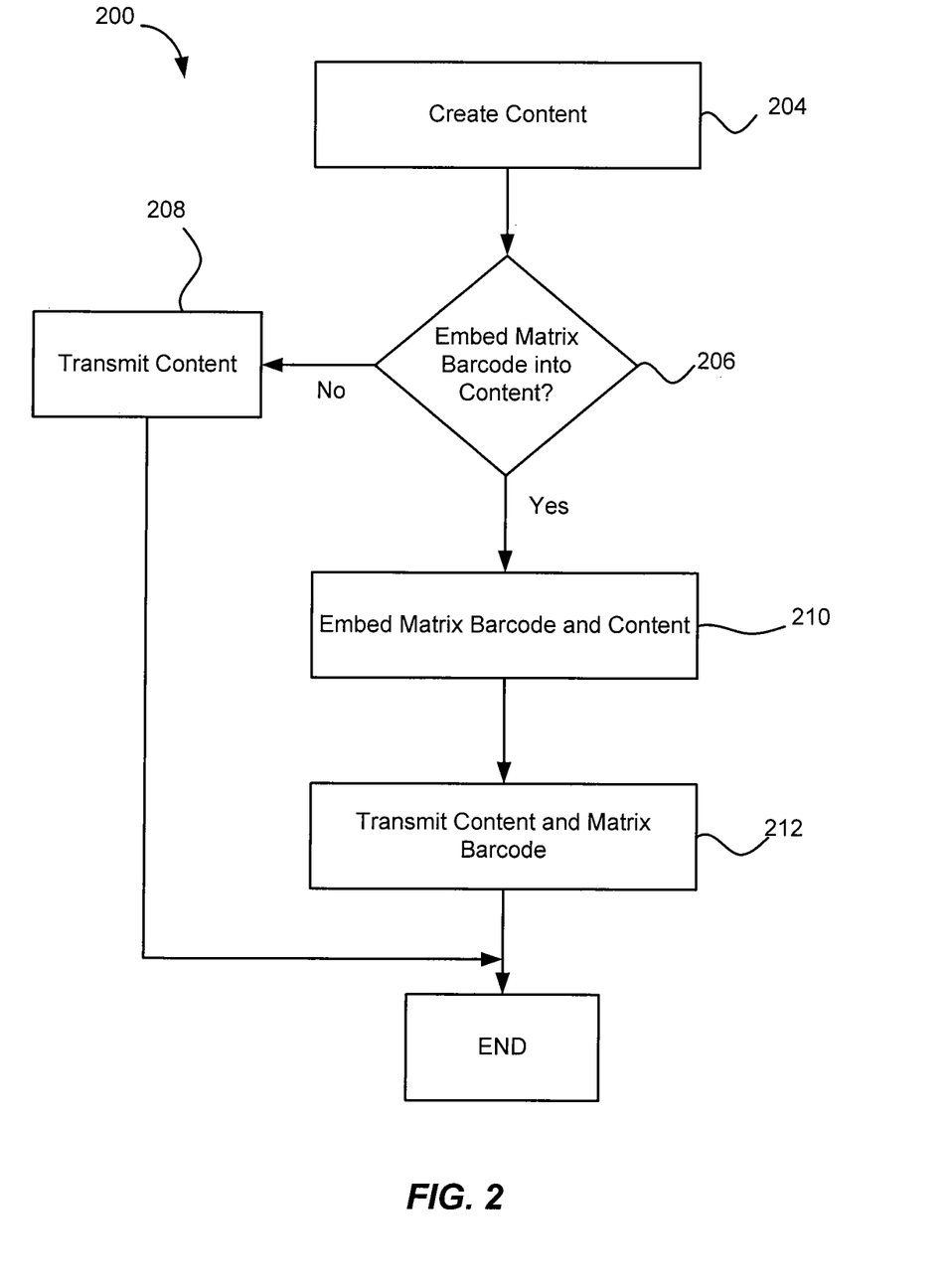
FIG. 2 is a flow chart illustrating a method for fingerprinting content to include origination or source data.

FIG. 2 is a flow chart illustrating a method 200 for fingerprinting content. Generally, the method shown in FIG. 2 may be performed by a content creator and/or distributor. The content source 102 may include content, such as audiovisual content. The content source 102 may originate at a broadcast headend, broadcasting center, or other similar broadcasting source (not shown). In operation 204 the content is created, in this operation 204 audiovisual content, such as a television show, movie, and so on may be recorded or otherwise captured. After the content is created and ready to be transmitted the method 200 may proceed to operation 206. In this operation 206, the content is evaluated to determine if a matrix barcode 128 should be embedded within the content; that is, the evaluation determines whether the content should be fingerprinted. If a matrix barcode 128 is not going to be embedded, the method 200 proceeds to operation 208 and the content is transmitted. In this operation 208, the content may be included in the content source 102 signal. For example, the content may relate to a particular television show, and the content source 102 may include numerous different content signals corresponding to various different television channels.

If, at operation 206, the content is to be fingerprinted such that the matrix barcode 128 is inserted into the content, then the method 200 proceeds to operation 210 and the matrix barcode 128 is embedded into the content. The matrix barcode 128 may be configured to be visible to the user when displayed on a display device 110, 116. Alternately, the matrix barcode 128 may be configured to be substantially invisible to the user. For example, the matrix barcode 128 may be configured to appear only on a single frame or a couple of frame, so that when the content is viewed under normal conditions (e.g., not paused or stopped), the matrix barcode 128 may not visible. These embodiments may be beneficial as users may not realize that the content is fingerprinted and therefore may not attempt to remove or delete the matrix barcode 128 from the content. In at least one embodiment, the matrix barcode 128 may be embedded in metadata associated with the content, such that the matrix barcode 128 may be accessed on-demand during playback of the content. After operation 206, the method 200 proceeds to operation 212 and the fingerprinted content is transmitted. For example, the content and the matrix barcode 128 may be included in the content source 102 that is transmitted to the content receiver 104.

Figure 3:
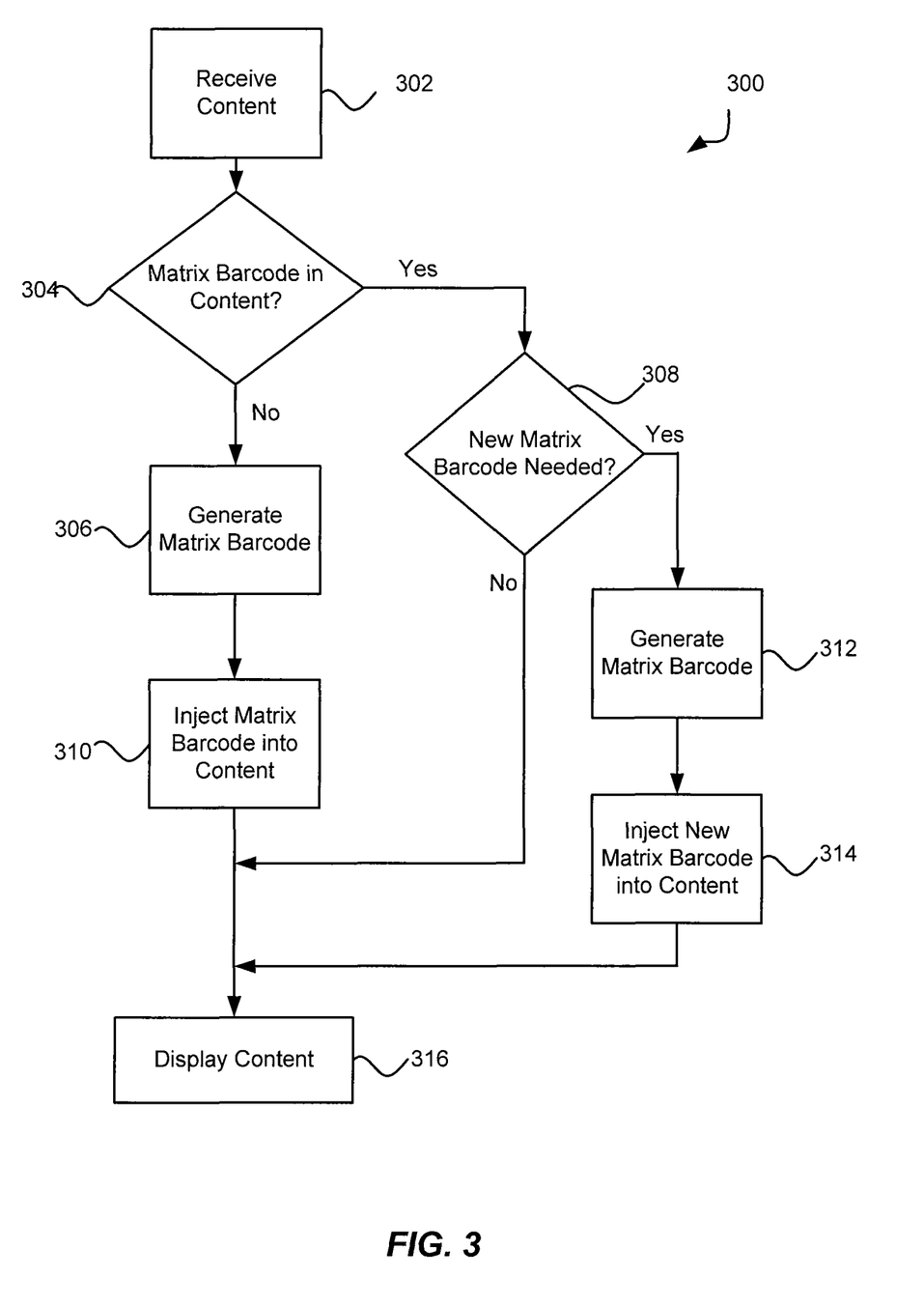
FIG. 3 is a flow chat illustrating another embodiment of a method for fingerprinting and displaying content.

FIG. 3 illustrates another embodiment of a method 300 for fingerprinting content. Generally, the method shown in FIG. 3 is executed by or at a content receiver. The method begins with operation 302 in which the content is received, for example by the content receiver 104. For example, the content may be included in the video signal 102, which may be transmitted from a broadcast headend or other content provider. After the content is received, the method 300 proceeds to operation 304 and the content is analyzed to determine whether there is a matrix barcode 128 already included within the content (e.g., whether the content is already fingerprinted). For example, in method 200 at operation 210, a matrix barcode 128 may be embedded within the content, and therefore when the video signal 102 is transmitted to the content receiver 104, the matrix barcode 128 may also be transmitted to the content receiver 104.

If a matrix barcode 128 is not included within the content (that is, the content is not already fingerprinted), then the method 300 may proceed to operation 306. In this operation 306, the content receiver 104 may generate a matrix barcode 128. The generated matrix barcode 128 may include data such as a identification number for the content receiver 104, user data, content information, display data, and any other suitable data discussed herein. The content receiver 104 may create the matrix barcode 128 based on data stored in memory storage 122, as well as data included within the video signal 102. For example, information identifying either or both of the content receiver and an associated user may be stored in the memory storage 122, whereas information related to the content may be transmitted from a content provider and arrive with or be associated with the input signal 102.

After the content receiver 104 generates a matrix barcode 128, the method 300 may proceed to operation 310 and the matrix barcode 128 may be injected, embedded, overlaid or otherwise included within the content. At this operation 310, the matrix barcode 128 may be configured to be displayed, transmitted, copied, and so on along with the content. In other words, the content is watermarked or fingerprinted with the matrix barcode 128. As the content is displayed on the display devices 110, 116 the matrix barcode 128 may also be displayed. Additionally, at this operation 310 the display rate of the matrix barcode 128 may be determined. For example, the matrix barcode 128 may be configured to be displayed on a single frame, a couple of frames or numerous frames. Additionally, the matrix barcode 128 may be configured to be displayed at the beginning, the middle, or the end of the content. Furthermore, the matrix barcode 128 may be configured to be displayed at once, twice or multiple times throughout the content.

If it is determined at operation 304 that a matrix barcode 128 is already included in the content, then the method 300 proceeds to operation 308. At operation 308 the content receiver 104 determines whether a new matrix barcode 128 is needed (e.g., whether the content should be additionally watermarked/fingerprinted). For example, in some instances, a new matrix barcode 128 may not be needed, e.g., some content may not need to be tracked if it is re-transmitted. If no matrix barcode 128 is needed then the method 300 proceeds to operation 316 and the content is displayed on the display device 110. However, if a new matrix barcode 128 is needed then the method 300 proceeds to operation 312. In operation 312, the content receiver 104 generates a new matrix barcode 128. It should be noted that the original matrix barcode 128 already included in the content (e.g., from operation 210 in method 200) may be replaced or supplemented. In other words, two matrix barcodes 128 may be included in the content or a new matrix barcode 128 may replace the original matrix barcode 128 embedded within the content. Additionally, operation 312 may be substantially the same as operation 306, although in operation 312 the content data (e.g., title, channel) may be extracted from a matrix barcode 128 that may already be included in the content.

After operation 312, the method 300 may proceed to operation 314, and the new matrix barcode 128 is injected, embedded or otherwise included in the content. This operation 314 may be substantially similar to operation 310. However, in this operation 314, the matrix barcode 128 may be included in addition to or in replace of the matrix barcode 128 previously included in the content (for example, any matrix code embedded at operation 210 in method 200). Once the new matrix barcode 128 has been included in the content, the content is fingerprinted and the method 300 proceeds to operation 316 in which the fingerprinted content is displayed. This operation 316 may be performed by the display device 110. For example, the content receiver 104 may transmit the fingerprinted content the display device 110, which they may display the content and the matrix barcode(s) 128.

Figure 4:
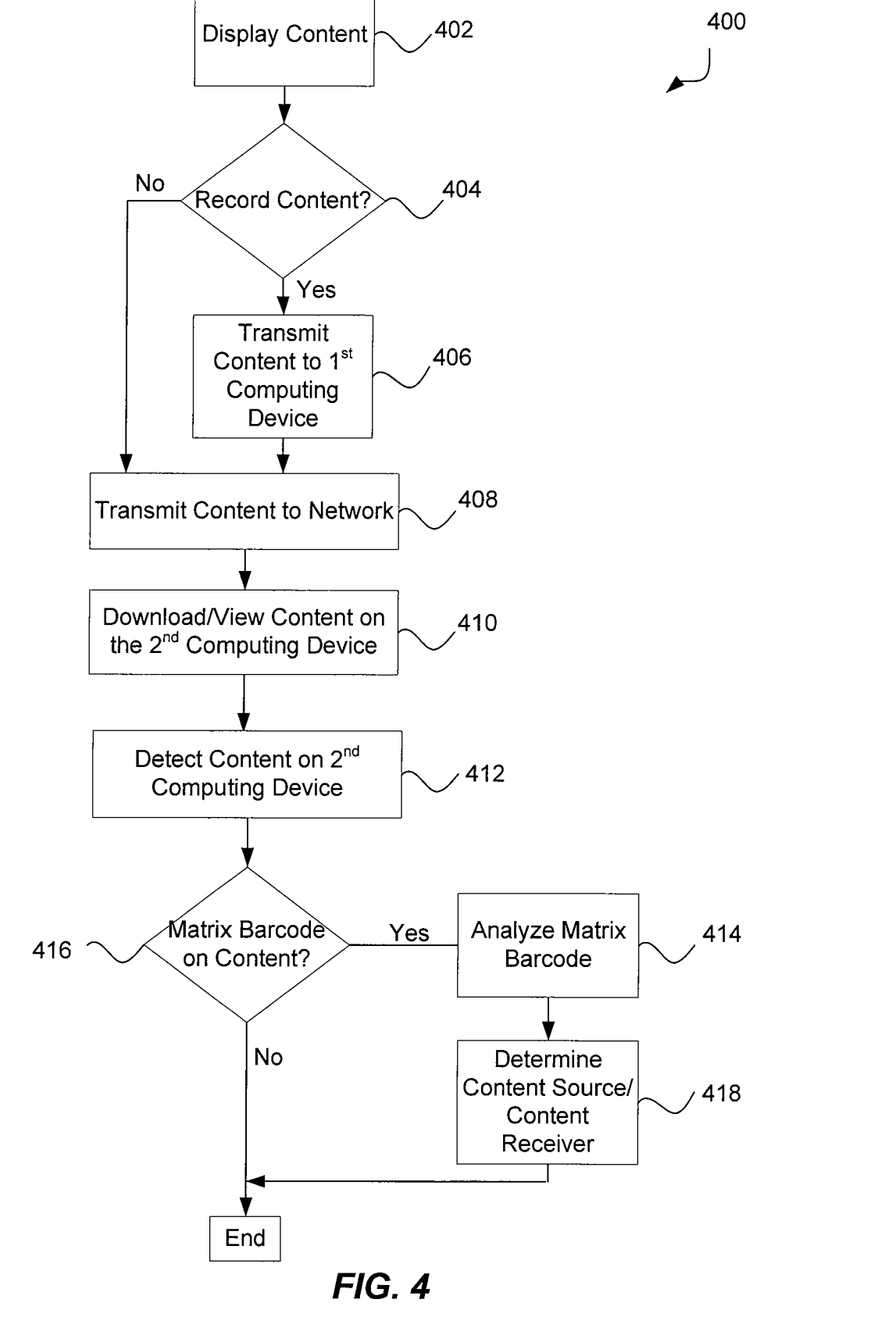
FIG. 4 is a flow chart illustrating a method for detecting an original content source via fingerprinting the content.

FIG. 4 is a flow diagram illustrating a method 400 for using the matrix barcode 128 as a watermark or fingerprint. The method 400 begins with operation 402, in which the fingerprinted content is displayed. This operation 402 may be substantially similar to operation 316 in FIG. 3. For example, the display device 110 may display the content and the matrix barcode 128. As the fingerprinted content is being displayed, the method 400 may proceed to optional operation 404. In operation 404 the fingerprinted content may be recorded. If the fingerprinted content is not recorded, the method 400 may proceed to operation 408 and then fingerprinted content may be transmitted to the network 112. In some embodiments, the content receiver 104 may transmit the fingerprinted content to the network 112 or may transmit the fingerprinted content to the first computing device 106, which may then transmit the fingerprinted content to the network 112. The fingerprinted content may be transmitted without being separately recorded, because the content receiver 104 may have downloaded or otherwise stored the fingerprinted content as it was being displayed or before the fingerprinted content was displayed. For example, the content receiver 104 may be a digital video recorder and record the fingerprinted content prior to the content being displayed on the display device 110.

However, if in operation 404 it is determined that the fingerprinted content may be recorded, then the recording device 108 records the fingerprinted content. For example, the recording device 108 may be a digital video disc recorder and may record the fingerprinted content as it is displayed on the display device 110. After the fingerprinted content is recorded, the method 400 may proceed to operation 406 and the fingerprinted content may be transmitted to the first computing device 106. It should be noted that in some embodiments, the recording device 108 may be incorporated into the first computing device 106 and therefore, this operation may be omitted. However, in other embodiments, the fingerprinted content may be transmitted from the recording device 108 to the first computing device 106 via the network 112 or via a hardwired connection.

After operation 406, the method 400 may proceed to operation 408 and the fingerprinted content may be transmitted to the network 112. For example, the fingerprinted content may be uploaded to a website/server, linked to, or otherwise enabled to be accessed by other computing devices, other than the first computing device 106, e.g., the second computing device 114. In one embodiment, the fingerprinted content may be uploaded to peer-to-peer sharing website/service. In another embodiment, the fingerprinted content may be uploaded to a content-sharing website, such as YOUTUBE. In still other embodiments, the fingerprinted content may be electronically mailed or otherwise provided directly to other users.

After the fingerprinted content has been transmitted to the network 112, the method 400 may proceed to operation 410. In this operation 410, the fingerprinted content may be viewed, downloaded or otherwise accessed on the second computing device 114. For example, a user may view the content on the content-sharing website. In these embodiments the second user may not be authorized to view the content. In other embodiments, the content may actually be downloaded on the second computing device 114, e.g., if the content was electronically mailed, or shared via a peer-to-peer file sharing website. The second computing device may be a set-top box or other television receiver, in certain embodiments.

The method 400 may then proceed to operation 412 and the fingerprint in the content may be detected on the second computing device 114. For example, the content owner may scan the content to view the fingerprint. As another option, software, hardware or firmware associated with the second computing device may be configured to recognize QR code patterns. In this embodiment, the second computing device may thus analyze the content frame by frame and look for the QR code or other matrix code occurring in at least a single frame. The second computing device 114 may be a server hosting the website, a computing device of a peer-to-peer network, a laptop or desktop computing device, a mobile phone, a tablet device, a set-top box, and so on. The fingerprinted content may be detected by viewing, downloading or otherwise accessing the content.

After the fingerprinted content has been detected, the method 400 may proceed to operation 416 in which the content is analyzed to determine if there is a matrix barcode 128 associated with the content (e.g., whether the content has been fingerprinted). The matrix barcode 128 may have been included in the content by the content provider (e.g., in operation 210 in FIG. 2) or by the content receiver (e.g., in operations 310, 314 in FIG. 3). If there is no matrix barcode 128 included in the content, then the original source of the content may not be able to be determined and the method ends. However, if there is a matrix barcode 128 in the content, then the original source of the content may be determined. For example, if there is a matrix barcode 128 in the content, the method may proceed to operation 417 and the matrix barcode is analyzed.

Operation 417 may be performed by the reading device 118 or, more likely, by the second computing device 114. The reading device 118 may capture the matrix barcode(s) 128 via the optical component 156. The processor 150 may analyze the matrix barcode(s) 128 to extract the data. As the data may include data corresponding to the content receiver 104, data corresponding to the content (e.g., copyright owner, content provider, title), and other data the method 400 may proceed to operation 418. Alternatively, the second computing device 114 may execute or include functionality permitting it to not only detect the fingerprint but also to analyze it and extract data in the manner previously discussed.

In operation 418 the original content source and uploading information may be determined. For example, the original content receiver 104 that received the video signal 102 containing the content, the time/date the content was displayed, the channel, the content provider, and so on may be determined. Once the content source may be determined, the content owner may then decide whether to protect the content and/or attempt to prevent unauthorized transmissions, uploading, and/or sharing of the content, as well as whether or not to contact the content uploader. As one option, the secondary computing device 112 may provide the content source and/or receiver to a user, or any other data that was included in the fingerprint. Following operation 418, the method ends.

In methodologies directly or indirectly set forth herein, various steps and operations are described in one possible order of operation but those skilled in the art will recognize the steps and operation may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Embodiments herein may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

What is claimed is:

1. A method for fingerprinting content, comprising:
receiving content at a content receiving device from a broadcasting source, wherein the content receiving device is a set-top box, a television receiver, a digital video recorder, or a computer;
analyzing, by the content receiving device, the received content;
identifying, by the content receiving device, an original matrix barcode that identifies an owner of the received content;
removing the original matrix barcode from the received content;
extracting content data from the original matrix barcode;
subsequent to the extraction, generating, by the content receiving device, a replacement matrix barcode encoding the extracted content data as well as receiver data corresponding to the content receiving device;

inserting, by the content receiving device, the replacement matrix barcode into the received content at the same position as was located the original matrix barcode to produce modified content; and outputting, by the content receiving device, the modified content for display.

2. The method of claim 1, wherein the replacement matrix barcode is inserted in multiple positions of the modified content to be displayed periodically as the modified content is displayed.

3. The method of claim 1, wherein the replacement matrix barcode is inserted once into the modified content to be displayed in a single frame of the modified content.

4. The method of claim 1, wherein the matrix barcode is inserted in multiple frames of the modified content to be displayed on multiple sequential frames of the modified content.

5. The method of claim 1, wherein the content receiving device is a television receiver.

6. The method of claim 1, wherein the content data comprises at least one of:
   a title of the content;
   a content owner name; and
   a content provider name.

7. The method of claim 1, wherein the receiver data comprises at least one of:
   receiver identification information;
   account information corresponding to an account for receiving content; and
   a time the content was received at the content receiver.

8. A content receiver, comprising:
   a receiver configured to receive a video signal comprising audiovisual content, wherein the receiver is a set-top box, a television receiver, a digital video recorder, or a computer;
   an analyzer that analyzes the received audiovisual content to locate an original matrix barcode that identifies an owner of the received audiovisual content;
   an extractor that extracts content data from the original matrix barcode;
   a matrix barcode generator that produces a replacement matrix barcode comprising the extracted content data as well as receiver data identifying the content receiver;
   a fingerprinter that produces fingerprinted content comprising the analyzed audiovisual content and the replacement matrix barcode; and
   an output configured to output the fingerprinted content.

9. The system of claim 8, wherein the content receiver is a television receiver.

10. The system of claim 8, wherein the extracted content data includes a content owner identity and a content provider identity.

11. The system of claim 8, wherein the receiver data comprises an identification number for the content receiver and user identity for a user account associated with the content receiver.

12. The system of claim 8, wherein the fingerprinted content further comprises a second replacement matrix barcode positioned in an additional position within the fingerprinted content.

13. A non-transitory, processor-readable storage medium of a content receiver including processor-readable instructions, which when executed cause one or more processors to:
   analyze received content from a broadcasting source;
   locate an original matrix barcode that identifies an owner of the received content;
   remove the original matrix barcode from the received content;
   extract content data from the original matrix barcode;
   subsequent to the extraction, generate a replacement matrix barcode encoding the extracted content data as well as receiver data corresponding to the content receiver;
   insert the replacement matrix barcode into the received content at the same position as was located the original matrix barcode to produce modified content; and
   output the modified content for display.

14. The non-transitory, processor-readable storage medium of a content receiver of claim 13, wherein the replacement matrix barcode is inserted in multiple positions of the modified content to be displayed periodically as the modified content is displayed.

15. The non-transitory, processor-readable storage medium of a content receiver of claim 13, wherein the replacement matrix barcode is inserted once into the modified content to be displayed in a single frame of the modified content.

16. The non-transitory, processor-readable storage medium of a content receiver of claim 13, wherein the matrix barcode is inserted in multiple frames of the modified content to be displayed on multiple sequential frames of the modified content.

17. The non-transitory, processor-readable storage medium of a content receiver of claim 13, wherein the content receiver is a television receiver.

18. The non-transitory, processor-readable storage medium of a content receiver of claim 13, wherein the extracted content data includes a content owner identity and a content provider identity.

19. The non-transitory, processor-readable storage medium of a content receiver of claim 13, wherein the receiver data comprises an identification number for the content receiver and user identity for a user account associated with the content receiver.

* * * * *